(12) United States Patent
Belfiglio

(10) Patent No.: US 7,325,473 B2
(45) Date of Patent: Feb. 5, 2008

(54) SAW BLADE GUIDE AND COMPONENTS THEREFOR

(76) Inventor: Edward E. Belfiglio, 6485 Summit Dr., Owensboro, KY (US) 42303-9599

( * ) Notice: Subject to any disclaimer, the term of this patent is extended or adjusted under 35 U.S.C. 154(b) by 92 days.

(21) Appl. No.: 11/027,182

(22) Filed: Dec. 28, 2004

(65) Prior Publication Data

US 2005/0109184 A1 May 26, 2005

Related U.S. Application Data

(63) Continuation-in-part of application No. 09/644,484, filed on Aug. 23, 2000, now Pat. No. 6,889,589.

(51) Int. Cl.
*B26D 1/54* (2006.01)
*B27B 13/10* (2006.01)

(52) U.S. Cl. .................... 83/824; 83/820; 83/829

(58) Field of Classification Search .............. 83/820, 83/821, 824, 829
See application file for complete search history.

(56) References Cited

U.S. PATENT DOCUMENTS

| | | | |
|---|---|---|---|
| 177,622 A * | 5/1876 | Cordesman, Jr. ............ 83/829 |
| 201,498 A * | 3/1878 | Clark .......................... 83/824 |
| 313,025 A * | 2/1885 | Rowlett ....................... 83/410 |
| 425,105 A | 4/1890 | McChesney | |
| 651,652 A | 6/1900 | Davis | |
| 732,799 A * | 7/1903 | Trout et al. ................. 83/545 |
| 2,743,745 A | 5/1956 | Teague | |
| 2,760,531 A | 8/1956 | Tommila | |
| 3,104,575 A | 9/1963 | Robinson | |
| 3,489,189 A | 1/1970 | Thrasher | |
| 3,534,647 A | 10/1970 | Mills | |
| 3,563,285 A * | 2/1971 | Thrasher ..................... 83/818 |
| 3,593,763 A | 7/1971 | Neild | |
| 3,872,762 A * | 3/1975 | McKillip et al. ............. 83/820 |
| 4,563,928 A | 1/1986 | Salomonsson | |
| 4,625,810 A | 12/1986 | Edmisson | |
| 4,632,074 A | 12/1986 | Takahashi et al. | |
| 4,644,833 A | 2/1987 | Jenkner | |
| 4,920,846 A | 5/1990 | Duginske et al. | |
| 5,211,092 A | 5/1993 | Blasi | |
| 5,410,934 A | 5/1995 | Krippelz | |
| 5,497,684 A | 3/1996 | Martin | |
| 5,993,915 A | 11/1999 | Krebsbach | |
| 6,202,528 B1 | 3/2001 | Morgan | |

\* cited by examiner

*Primary Examiner*—Clark F. Dexter
(74) *Attorney, Agent, or Firm*—C. Richard Martin

(57) ABSTRACT

An improved guide for stabilizing the saw blade of a saw mill assembly is provided. The guide includes a guide block having a first surface for engaging a surface of a saw blade and a second opposing surface. A threaded shaft extends outwardly from the second surface of the guide block, and is generally rotatable in relation to the guide block. A securing nut threadably engages the shaft such that a surface of the securing nut engages the second surface of said guide block upon rotation into engagement therewith thereby rendering the threaded shaft nonrotable in relation to the guide block. An improved guide block or insert is also provided. The insert is bi-metallic such that the metallic material proximal to a first blade-engaging surface thereof is harder than the metallic material proximal to a second guide-engaging surface.

17 Claims, 5 Drawing Sheets

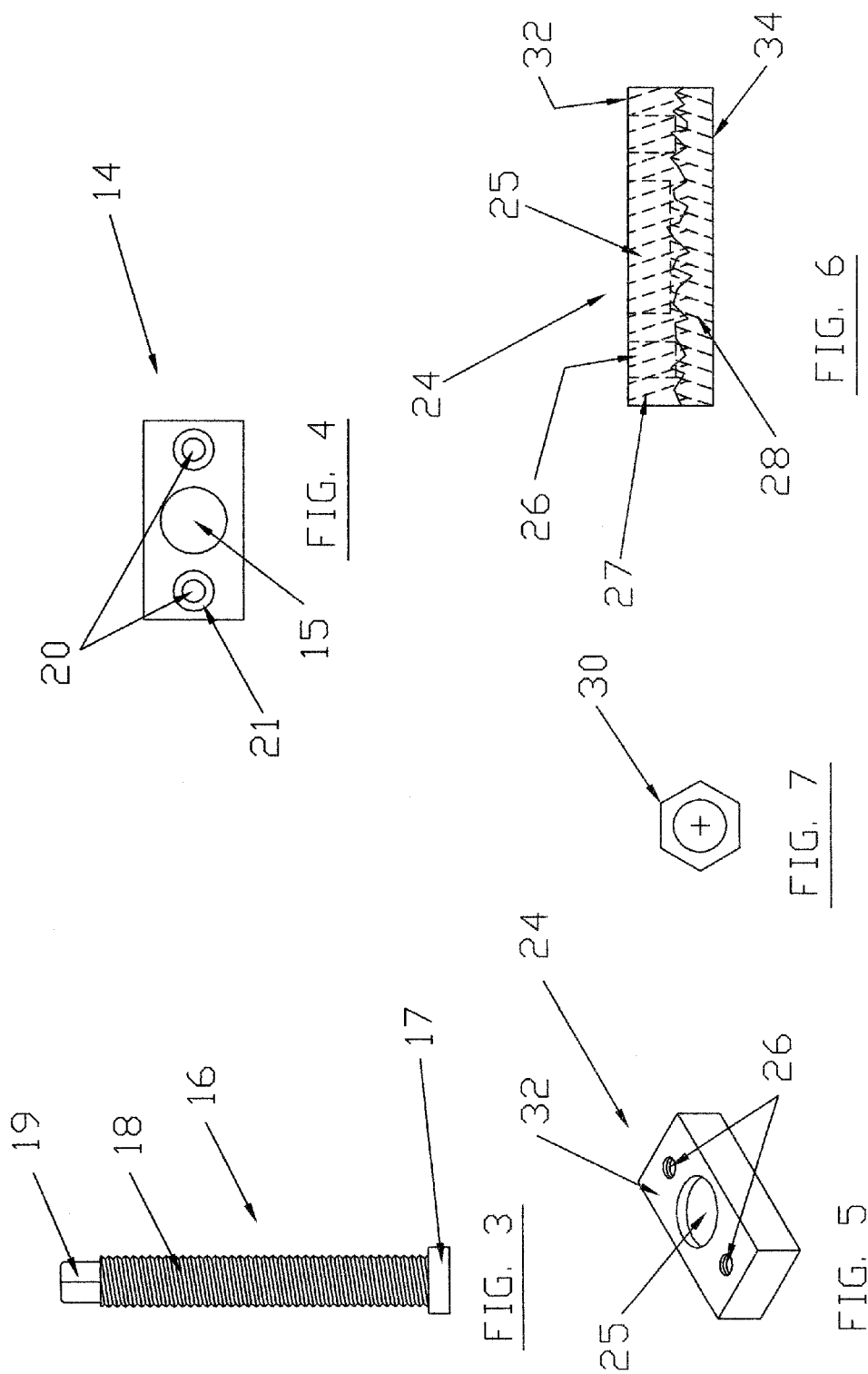

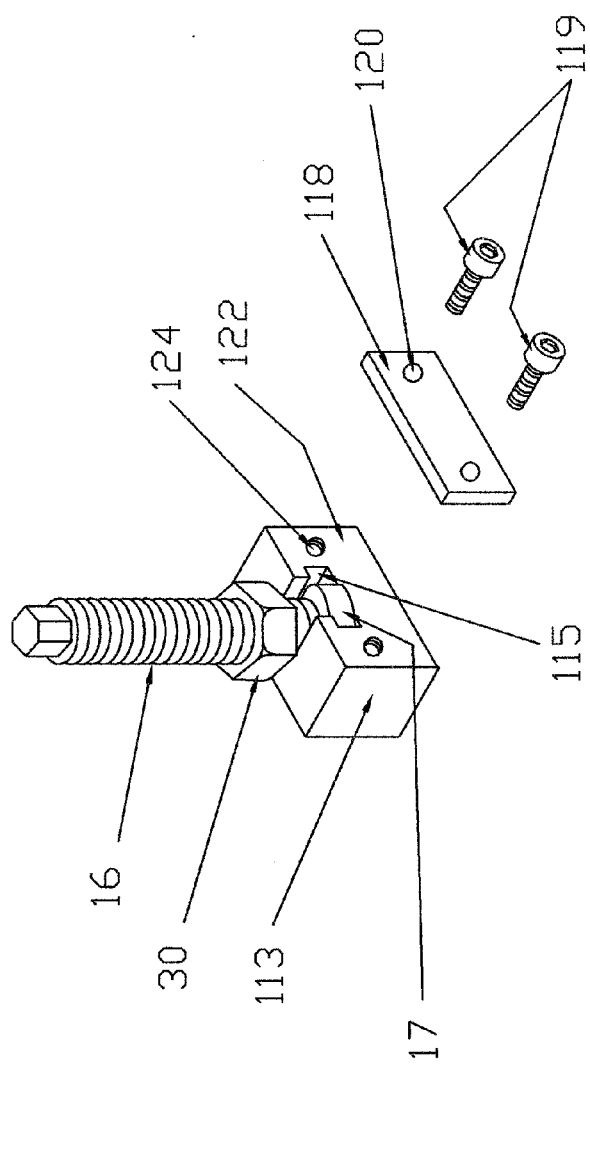
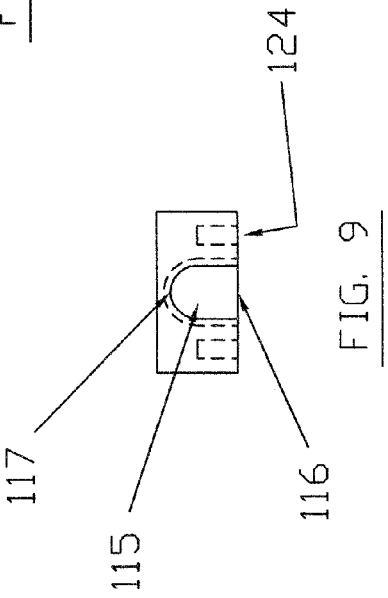
FIG. 8
FIG. 9

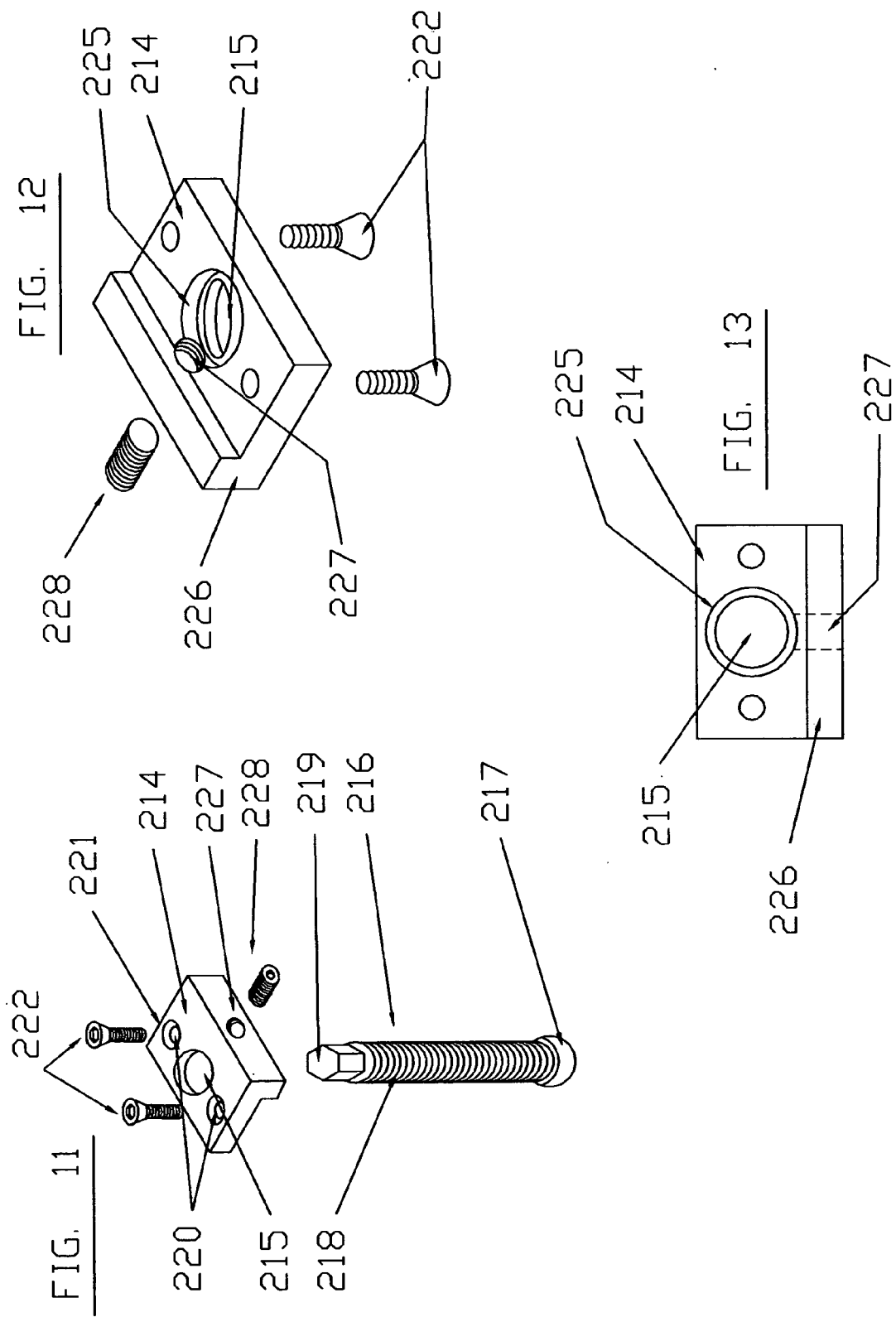

SAW BLADE GUIDE AND COMPONENTS THEREFOR

This application is a Continuation-in-part of application Ser. No. 09/644,484 filed on Aug. 23, 2000 now U.S. Pat. No. 6,889,589.

BACKGROUND OF THE INVENTION

This invention relates generally to saw blade guides and blocks or inserts used on such guides to stabilize a circular saw blade or a band saw blade of a sawmill. More specifically, this invention relates to a saw blade guide that incorporates a rotational device for orienting said saw blade guide to an optimum position and providing microscopic adjustment of said saw blade guide on a saw blade and the inserts for the saw blade guide.

Generally, saw blade guides have long been known and used for stabilizing both circular saw blades and band saw blades. While some early saw blade guides, such as those disclosed in U.S. Pat. No. 425,105 to R. McChesney issued on Apr. 8, 1890, use inserts or blocks which are removably fastened to the saw blade guide by means of threaded fasteners, none of those prior art inserts uses cap screws for holding the inserts in place. Further, none of those prior art inserts are countersunk or counterbored within the insert or guide block.

Moreover, none of the prior art inserts that are mounted on the blade guides are constructed of a bimetal consisting of carbon steel on one surface and an austenitic chromium carbide abrasion resistant alloy on the opposing surface of the insert.

Further, none of the prior art saw guides and inserts incorporate a system for rotating a rectangular insert on a cylindrical head which incorporates a threaded rod. The cylindrical head and threaded rod allows for microscopic adjustment of the saw guide and orientation of the rectangular guide and insert for optimum stabilization, and a securing nut for holding the guide in its optimum position.

SUMMARY OF THE INVENTION

It is the object of my invention to provide a novel metal insert for a saw blade guide of a sawmill.

It is a further object of my invention to provide a novel metal insert for a saw blade guide that is removably attached to the saw guide.

It is a further object of my invention to provide a novel metal insert for a saw blade guide, which is constructed of a bimetal. The bimetal insert is formed such that the metallic material on the portion of the insert that comes into contact with the saw blade is harder than the metallic material near the opposing surface thereof. The bimetal according to a preferred embodiment comprises an austenitic chromium carbide abrasion resistant alloy on the surface that comes into contact with the saw blade and carbon steel on the opposing side of the insert.

It is a further object of my invention to provide a novel device for rotating a rectangular guide with an insert attached on a cylindrical head and incorporating a threaded rod for the purpose of microscopic adjustment and optimum orientation of the guide and insert to the saw blade, and providing a securing nut on said threaded rod for holding the guide in position.

Briefly, in accordance with my invention there is provided a metal insert for a saw blade guide for stabilizing a saw blade. The material selected for the insert is from the group consisting of a bimetal with one side carbon steel and the opposite side an austenitic chromium carbide abrasion resistant alloy that has a Brinell hardness number between about 460 to 614.

Further, in accordance with my invention, there is provided a saw blade guide for mounting a blade-stabilizing insert thereon. The guide consists of a base plate and an insert disposed on one surface of the base plate. The block and the insert define an interiorily drilled and counterbored blind hole that contains the cylindrical end of the threaded rod. Said insert is attached to the guide block by means of screws passing through drilled and countersunk holes in the guide block and into tapped holes in the insert. A securing nut engaging the outer surface of the threaded shaft is also provided. The securing nut is rotatable with respect to the threaded shaft such that a surface of the securing nut engages the top surface of said base plate upon rotation into engagement therewith thereby rendering the threaded shaft non-rotable in relation to the base plate.

These and other objects, features and advantages of the present invention will become apparent to those skilled in the art from the following detailed description and attached drawings upon which, by way of example, only the preferred emodiments of my invention are illustrated.

BRIEF DESCRIPTION OF THE DRAWINGS

FIG. 3 shows a front elevation view of a cylindrical rotational device and incorporated threaded rod being a component of the preferred embodiment of a guide for stabilizing a saw blade shown in FIG. 1.

FIG. 4 shows a top plan view of a rectangular base plate being a component of the preferred embodiment of a guide for stabilizing a saw blade shown in FIG. 1.

FIG. 5 shows a perspective view of a novel saw guide insert being a component of FIG. 1.

FIG. 6 shows a side elevation view of a novel saw guide insert being a component of FIG. 1.

FIG. 7 shows a top plan view of a jam nut being a component of the guide shown in FIG. 1.

FIG. 8 shows an exploded perspective view of a guide for stabilizing a saw blade according to an alternative embodiment of the present invention.

FIG. 9 shows a top plan view of a guide insert being a component of the guide shown in FIG. 8.

FIG. 11 shows a perspective view of a cylindrical rotational device and incorporated threaded rod and rectangular base plate being components of the alternative preferred embodiment of a guide for stabilizing a saw blade shown in FIG. 10.

FIG. 12 shows a perspective view of a rectangular base plate being a component of the alternative preferred embodiment of a guide for stabilizing a saw blade shown in FIG. 10.

FIG. 13 shows a top plan view of a rectangular base plate being a component of the alternative preferred embodiment of a guide for stabilizing a saw blade shown in FIG. 10.

DESCRIPTION OF THE PREFERRED EMBODIMENTS

Figure 1:
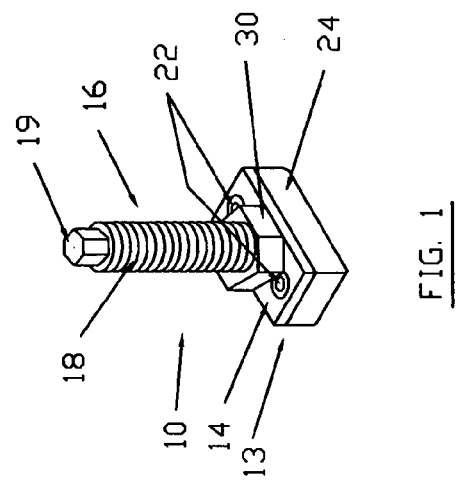
FIG. 1 shows a perspective view of a guide for stabilizing a saw blade according to a preferred embodiment of the present invention.
Figure 2:
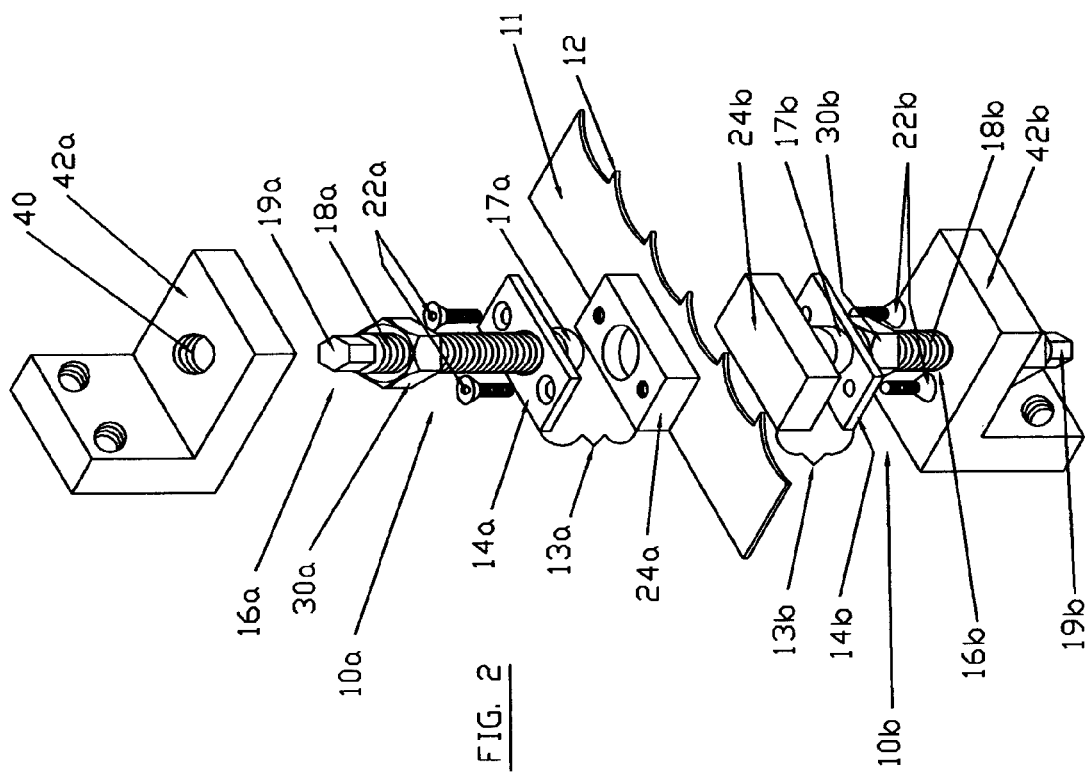
FIG. 2 shows an exploded perspective view of a pair of opposing guides for stabilizing a saw blade, illustrating a preferred embodiment of the present invention.

Referring now to the drawings and, in particular, to FIG. 1 and FIG. 2, there is shown in a preferred embodiment of my invention, an improved blade guide 10, for use in a conventional band saw mill assembly (not shown) to stabilize a band saw blade 11 having cutting teeth 12. The use of two improved blade guides 10a, 10b on opposing surfaces of the blade 11, as shown in FIG. 2, limits or effectively prevents lateral vibration, bending or dishing of the blade during sawing operations. A third blade guide (not shown) may be further positioned along the smooth edge of the blade to prevent longitudinal vibration or displacement of the blade. At the outset, it will be understood that the assemblies 10a, 10b can also be used to stabilize a circular saw blade of a circular saw mill if so desired.

Each blade guide 10 includes a guide block 13, which according to the embodiment shown in FIGS. 1-7, includes a base plate 14 having a top surface and a bottom surface and an insert 24. The base plate 14 and insert 24 are preferably rectangular in shape as shown in the drawings, however, other polygonal shapes and configurations are also contemplated. An opening 15 disposed in the center region of the base plate 14 is configured to rotatably receive a threaded shaft 16 therein. The shaft 16 has an enlarged head section 17 at a first end thereof, a male-threaded section 18 along at least a portion of the length thereof, and a hexagonal head 19 at a second end thereof.

The opening 15 in the base plate is of a diameter larger than the outer diameter of the threaded section 18 of the shaft 16, but smaller in diameter than the diameter of the enlarged head section 17. Therefore, in assembling the blade guide, the length of the shaft is passed through the opening 15 until the enlarged head section 17 comes into contact with a bottom surface of the base plate 14, such that the shaft 16 can rotate freely in relation to the base plate 14.

The base plate 14 also includes one or more untapped screw holes 20 therein for receiving a corresponding one or more fasteners 22. According to the shown preferred embodiment, two holes 20 are formed in the base plate 14, one on either side of the larger central opening 15. Each screw hole 20 may have a recessed frustroconical countersunk or counterbored portion 21 formed above the screw hole 20 so that a cap screw, such as is shown at 22 in FIG. 1 and FIG. 2, can be inserted therein to a level below the upper surface of the base plate 14. Preferably the cap screws 22, as shown in the example of FIG. 1 and FIG. 2, is of the hex socket type for use of a standard hex wrench to secure and loosen the base plate 14 from a corresponding blade guide insert 24, although other types of commonly known cap screws and fasteners could be employed wherein a standard tool such as a screwdriver could be used to secure and remove the blade guide insert from the base plate.

The threaded shaft 16 is threadably received in a threaded opening 40 disposed in a conventional mounting bracket 42 (42a, 42b) of the saw mill assembly. The configuration of the mounting bracket 42 shown in FIG. 2 is old and well known in the art and the specific configuration of the bracket 42 is of no particular consequence to the invention. The position of the guide block 13 relative to the blade 11 can be adjusted by rotation of the shaft 16 in relation to the mounting bracket 42 thereby effectuating linear translational movement of the shaft 16 along its longitudinal axis. Rotation of the shaft 16 relative to the mounting bracket 42 can be effectuated by engaging the hexagonal head 19 with an appropriately sized and shaped tightening tool such as a wrench. The hexagonal configuration of the second end of the shaft 16 is merely one common example of a head configuration that permits the use of ordinary hand tools to impart rotation to the shaft. It is understood and contemplated that the head on the second end of the shaft may have different geometric configurations depending upon the tool that the user desires to employ. By way of example only, and not to limit the possible structures contemplated, the head 19 could be square to accommodate certain wrenches, slotted to accommodate a screwdriver, or a hex socket type for use of a standard hex wrench to secure.

The blade guide insert 24 comprises a metallic block of material having an upper surface 32 and a lower surface 34, each said surface having a generally rectangular shape, although other polygonal shapes are also contemplated. A circular recess 25 is formed in the central region of the upper surface 32 of the guide insert to rotatably receive the protruding enlarged head 17 of the shaft 16. One or more tapped screw holes 26, which correspond in location with said one or more untapped screw holes 20 in the base plate 14, are also provided in the upper surface 32 of the guide insert 24, for threadably receiving the corresponding one or more fasteners 22. According to the shown preferred embodiment, two holes 26 are formed in the upper surface of the guide insert 24, one on either side of the larger central recess 25, and corresponding to the two holes 20 formed in the base plate 14.

As best shown in FIG. 6, the guide insert 24 is formed of a bimetallic material such that the metal of lower region 28 is harder and more abrasion resistant than the metal of the upper region 27. The metal used on the lower region 28 will be in direct contact with the saw blade 11 by way of lower surface 34, and therefore should consist of a highly abrasion resistant alloy. Preferably austenitic chromium-carbide alloy having a Brinell hardness number between 460 and 614 is used as the metallic material for the lower region 28. The upper region 27 must consist of a sufficiently soft material to allow drilling for the tapped screw holes 26 and machining of the circular recess 25 therein. Preferably, carbon steel is used as the metallic material for the upper region 27. The bi-metallic guide insert is formed in such a way that the region near the center of the insert 24 consists of a combination of the two metals, thereby providing one unitary, solid, bimetallic block insert.

A securing nut 30 is provided to fixedly secure the base plate 14 and guide insert 24 in non-rotatable engagement with the shaft 16. The inner surface of the securing nut threadably engages the threaded region 18 of the shaft. By rotating the nut 30 in relation to the shaft, the nut can be translated along the longitudinal axis of the shaft 16. When the nut is translated to the lowermost position on the shaft 16, a lower surface of the nut 30 frictionally engages the upper surface of the base plate 14, thereby preventing rotation of the base plate with respect to the shaft. When the nut 30 is rotated such that the lower surface thereof does not frictionally engage the upper surface of the base plate, the guide block 13 is freely rotatable in relation to the shaft 16.

According to a preferred use and operation of the embodiment of the present invention shown in FIGS. 1-7, two guide assemblies 10a, 10b are disposed on opposing sides of the saw blade 11 to prevent lateral vibration, bending or dishing of the blade during sawing operations. The threaded shaft 16 is threadably received in a threaded opening disposed in a mounting bracket of the saw mill assembly. The position of the guide blocks 13a, 13b relative to the blade 11 are then adjusted by engaging the hexagonal heads 19a, 19b with an appropriate wrench to rotate the shafts 16a, 16b in relation to the mounting brackets to move the shafts 16a, 16b and guide blocks 13a, 13b along the longitudinal axis of the respective shafts 16a, 16b until the guide blocks 13a, 13b are optimal distances from the blade surface, and extend toward the opposing blade surfaces as shown in FIG. 2. The nuts 30a, 30b are disposed along the respective longitudinal axes of the shafts 16a, 16b such that the lower surface thereof is not in engagement with the upper surface of the respective base plates 14a, 14b, thereby permitting the base plates 14a, 14b and the inserts 24a, 24b respectively carried thereon to freely rotate about the axes of the respective shafts 16a, 16b. This allows the guide blocks 13a, 13b to be rotated such that the major longitudinal axis of each guide block aligns with the longitudinal axis of the blade 12. Once the guide blocks 13a, 13b are properly positioned, the nuts 30a, 30b are rotated until the lower surfaces thereof come into frictional engagement with the respective upper surfaces of the base plates 14a, 14b, and then the nuts are tightened against the base plates to prevent rotation of the base plate relative to the shaft, thereby securing the guide block in the properly aligned position with regard to the blade.

A guide block 113 according to an alternative preferred embodiment is shown in FIG. 8 and FIG. 9. The guide block 113 according to the alternative embodiment includes a T-slot 115 formed therein. The T-slot 115 has an open end 116 along one sidewall of the guide block and a closed end 117 near a central portion of the block 113. The closed end 117 may be rounded so as to accommodate the enlarged circular head 17 of the threaded shaft 16 therein. The guide is assembled by sliding the enlarged head 17 of the shaft 16 into the large opening of the T-slot with the shaft 16 extending through the smaller T-slot opening. The T-slot 115 is sized and shaped to allow rotation of the shaft 16 relative to the guide block 113. An end plate 118 is secured over the open end of the T-slot to secure the shaft 16 therein. The end plate 118 is secured to a side surface 122 of the guide block by fasteners 119 in the same manner the base plate of the first embodiment is secured to the insert; specifically, the fasteners 119 are inserted through untapped screw holes 120 and threadably received in tapped screw holes 124. A securing nut 30 is also provided to render the shaft nonrotatable in relation to the guide block when a surface of the nut engages the upper surface of the guide block 113.

Figure 10:
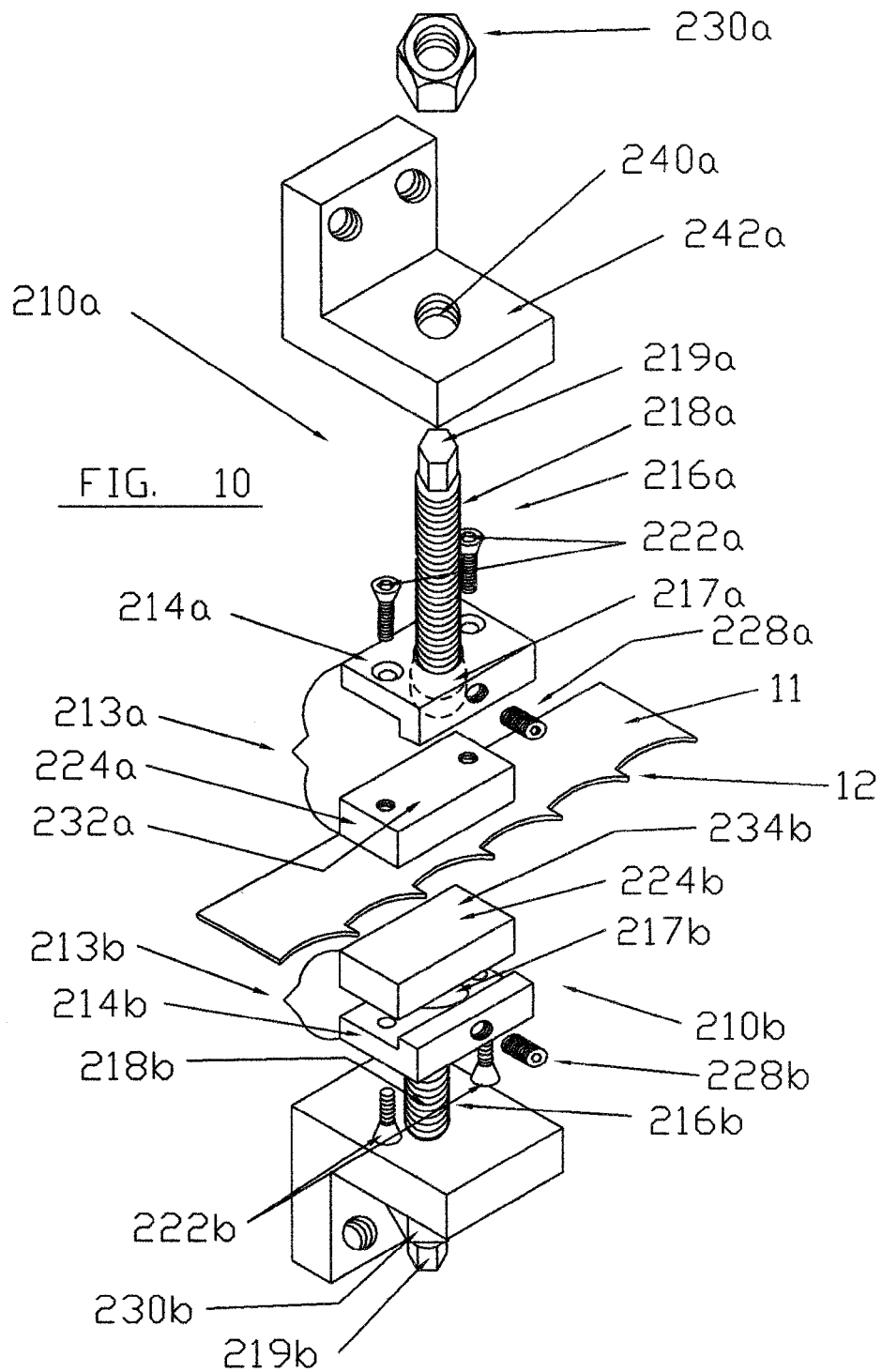
FIG. 10 shows an exploded perspective view of a pair of opposing guides for stabilizing a saw blade, illustrating an alternative preferred embodiment of the present invention.

An alternative preferred embodiment of the invention shown in FIGS. 10-13 shows an improved blade guide 210, for use in a conventional band saw mill assembly (not shown) to stabilize a band saw blade 11 having cutting teeth 12. The use of two improved blade guides 210a, 210b on opposing surfaces of the blade 11, as shown in FIG. 10, limits or effectively prevent lateral vibration, bending or dishing of the blade during sawing operations. A third blade guide (not shown) may be further positioned along the smooth edge of the blade to prevent longitudinal vibration or displacement of the blade. At the outset, it will be understood that the assemblies 210a, 210b can also be used to stabilize a circular saw blade of a circular saw mill if so desired.

Each blade guide 210 includes a guide block 213, which according to the embodiment shown in FIGS. 10-13, includes a base plate 214 having a top surface and a bottom surface and an insert 224. An opening 215 disposed in the center region of the base plate 214 is configured to rotatably receive a threaded shaft 216 therein. The shaft 216 has an enlarged head section 217 at a first end thereof, a male-threaded section 218 along at least a portion of the length thereof, and a hexagonal head 219 at a second end thereof.

The opening 215 in the base plate is of a diameter larger than the outer diameter of the threaded section 218 of the shaft 216, but smaller in diameter than the diameter of the enlarged head section 217. A concentric counterbore 225 having a diameter slightly larger than the outer diameter of the enlarged head section 217 is formed in the bottom surface of the base plate 214 for rotatably receiving the enlarged head section 217. In assembling the blade guide, the length of the shaft is passed through the opening 215 until the enlarged head section 217 rests inside the counterbore 225 such that the bottom surface of the enlarged head section 217 is at least flush with the bottom surface of the base plate 214, allowing the head section 217 and shaft 216 to rotate freely in relation to the base plate 214.

The base plate 214 also includes one or more untapped screw holes 220 therein for receiving a corresponding one or more fasteners 222. According to the shown preferred embodiment, two holes 220 are formed in the base plate 214, one on either side of the larger central opening 215. Each screw hole 220 may have a recessed frustroconical countersunk or counterbored portion 221 formed above the screw hole 220 so that a cap screw, such as is shown at 222 in FIGS. 10-12 can be inserted therein to a level below the upper surface of the base plate 214. Preferably the cap screws 222, as shown in the example of FIG. 10 and FIG. 11, is of the hex socket type for use of a standard hex wrench to secure and loosen the base plate 214 from a corresponding blade guide insert 224, although other types of commonly known cap screws and fasteners could be employed wherein a standard tool such as a screwdriver could be used to secure and remove the blade guide insert from the base plate.

The threaded shaft 216 is threadably received in a threaded opening 240 disposed in a conventional mounting bracket 242 of the saw mill assembly. The configuration of the mounting bracket 242 shown in FIG. 10 is old and well known in the art and the specific configuration of the bracket 242 is of no particular consequence to the invention. The position of the guide block 213 relative to the blade 11 can be adjusted by rotation of the shaft 216 in relation to the mounting bracket 242 thereby effecting linear translational movement of the shaft 216 along its longitudinal axis. Rotation of the shaft 216 relative to the mounting bracket 242 can be effectuated by engaging the hexagonal head 219 with an appropriately sized and shaped tightening tool such as a wrench. The hexagonal configuration of the second end of the shaft 216 is merely one common example of a head configuration that permits the use of ordinary hand tools to impart rotation to the shaft. It is understood and contemplated that the head on the second end of the shaft may have different geometric configurations depending upon the tool that the user desires to employ. By way of example only, and not to limit the possible structures contemplated, the head 219 could be square to accommodate certain wrenches, slotted to accommodate a screwdriver, or a hex socket type for use of a standard hex wrench to secure.

The blade guide insert 224 comprises a metallic block of material having an upper surface 232 and a lower surface 234, each said surface having a generally rectangular shape, although other polygonal shapes are also contemplated. Except for the absence of a circular recess formed in the central region of the upper surface, the blade guide insert according to this embodiment is identical to the blade guide insert 24 shown in FIGS. 1-9 and described above.

In certain applications there may not be sufficient clearance between the upper surface of the base plate and the lower surface of the mounting bracket to permit the use of a securing nut 30 to fixedly secure the base plate 14 and guide insert 24 in nonrotatable engagement with the shaft 16 as shown in FIGS. 1-9. This problem is overcome by the embodiment shown in FIGS. 10-13 whereby a flange 226 extends downwardly from the bottom side of the base plate 214 along one edge thereof. A threaded opening 227 extends through a side wall of the base plate, through the flange 226 and into the counterbore 225. A set screw 228 having a first end and a second end is threadably received in the threaded opening 227. The first end of the set screw is provided with means for engaging with a tool, such as an Allen wrench, to permit rotation of the set screw in the threaded opening. By rotating the set screw 228 in one direction, preferably clockwise, the second end thereof can selectively engage the enlarged head 217 of the shaft 216. Thus, when the set screw 228 is tightened, the second end thereof engages the enlarged head 217 of the shaft 216 thereby preventing relative rotation between the shaft 216 and base plate 214. The set screw may be rotated in the opposite direction thereby disengaging the second end of the set screw 228 from the enlarged head 217 thereby allowing relative rotation between the shaft 216 and base plate 214.

According to a preferred use and operation of the embodiment of the present invention shown in FIGS. 10-13, two guide assemblies 210a, 210b are disposed on opposing sides of the saw blade 11 to prevent lateral vibration, bending or dishing of the blade during sawing operations. The threaded shaft 216 is threadably received in a threaded opening 240 disposed in a mounting bracket 242 of the saw mill assembly. The position of the guide blocks 213a, 213b relative to the blade 11 are then adjusted by engaging the hexagonal heads 219a, 219b with an appropriate wrench to rotate the shafts 216a, 216b in relation to the mounting brackets 242a, 242b to move the shafts 216a, 216b and guide blocks 213a, 213b along the longitudinal axis of the respective shafts 216a, 216b until the guide blocks 213a, 213b are optimal distances from the blade surface, and extend toward the opposing blade surfaces as shown in FIG. 10. Securing nuts 230a, 230b are then threaded onto the shafts 216a, 216b and into engagement with upper surfaces of the respective mounting brackets 242a, 242b in order to prevent further rotation of the shaft in relation to the mounting bracket. The set screw 228 is initially positioned such that the second end thereof is not in engagement with the enlarged head 217 thereby permitting rotation of the guide block 213 relative to the shaft 216. The guide blocks 213a, 213b are then rotated such that the major longitudinal axis of each guide block aligns with the longitudinal axis of the blade 12. Once the guide blocks 213a, 213b are properly positioned, the set screws 228a, 228b are rotated until the second ends thereof come into frictional engagement with the respective enlarged heads 217a, 217b thereby preventing rotation of the base plate relative to the shaft, and securing the guide block in the properly aligned position with regard to the blade.

Although the present invention has been illustrated and described herein with respect to certain preferred embodiments, it is not intended that this patent should be limited in scope and coverage by such details other than as specifically set forth in the following claims.

I claim:

1. A guide for stabilizing a saw blade, said guide comprising:
    a guide block having a first polygonal shaped surface for engaging a surface of said saw blade and a second opposing surface;
    a single, threaded shaft extending outwardly from a centerpoint of said second surface of said guide block, said threaded shaft having a head on a first end thereof, said head rotatably engaging said guide block and a second end received in a mounting bracket of a saw mill, wherein said guide block is supported only by said single threaded shaft;
    a set screw threadably received in a threaded opening located in a side surface of said guide block, said set screw being rotatable with regard to said threaded opening and said guide block such that a first end of said set screw engages the shaft head upon rotation into engagement therewith thereby rendering the threaded shaft nonrotatable in relation to the guide block.

2. The guide of claim 1 wherein said guide block comprises:
    a base plate having a top surface, a bottom surface, and a flange extending downwardly from said bottom surface along an edge thereof; and
    an insert disposed on said bottom surface of said base plate, said insert having an upper surface in engagement with said bottom surface of said base plate and a lower surface forming said first polygonal shaped surface for engaging a surface of a saw blade.

3. The guide of claim 2 wherein said base plate further includes a circular opening formed in a center region thereof such that the threaded shaft passes therethrough.

4. The guide of claim 3, wherein said base plate further includes a counterbore formed in the bottom surface thereof, said counterbore having a diameter greater than the diameter of said circular opening and being concentric with said circular opening.

5. The guide of claim 4, wherein said threaded opening in said guide block is formed in said base plate and has a first end in a portion of the base plate from which said flange extends and in a wall of said threaded opening passing through said base plate to a side surface of said base plate forming said side surface of said guide block.

6. The guide of claim 1, wherein said guide block comprises a unitary bi-metallic block that includes the first polygonal shaped surface, the metallic material proximal to the first polygonal shaped surface of the bi-metallic block being harder than the metallic material proximal to a second opposite surface of the bi-metallic block.

7. The guide of claim 6, wherein the metallic material proximal to the first surface thereof is chromium-carbide.

8. The guide of claim 7, wherein the metallic material proximal to the first surface thereof is austenitic chromium-carbide.

9. A guide for stabilizing a saw blade, said guide comprising:
    a base plate having a top surface and a polygonal shaped bottom surface;
    a single, threaded shaft extending outwardly from a centerpoint of said top surface of said base plate, said threaded shaft having a first end rotatably engaging said base plate and a second end received in a mounting bracket of a saw mill;
    an insert disposed on said bottom surface of said base plate; and
    means for selectively non-rotatably engaging the base plate and the threaded shaft for fixing the insert in position for stabilizing the saw blade.

10. The guide of claim 9, wherein said insert is bi-metallic such that the metallic material of said bi-metallic insert proximal to a lower surface thereof is harder than the metallic material proximal to an upper surface thereof.

11. The guide of claim 10, wherein the metallic material proximal to the lower surface thereof is chromium-carbide.

12. The guide of claim 9 further comprising one or more fasteners extending through one or more corresponding openings in said base plate and into said upper surface of said insert for securing said insert to said base plate.

13. A saw blade guide attached to a mounting bracket of a saw mill, said saw blade guide having a unitary solid, bi-metallic block insert, said insert comprising:
   a first metallic material proximal to a first blade engaging surface thereof;
   a second metallic material proximal to a second guide engaging surface thereof, wherein said first metallic material is harder than said second metallic material; and
   a combination of said first metallic material and said second metallic material at a center region of said insert.

14. The saw blade guide of claim 13, wherein the first metallic material proximal to the first blade engaging surface thereof is austenitic chromium-carbide.

15. The saw blade guide of claim 14, wherein the second metallic material proximal to the second guide engaging surface thereof is carbon steel.

16. The saw blade guide of claim 13, wherein the second guide engaging surface of said bi-metallic block insert includes means for connecting said bi-metallic block insert to a base plate of the saw blade guide.

17. The saw blade guide of claim 16, wherein said connecting means includes one or more threaded openings in said bi-metallic block insert for receiving one or more corresponding threaded fasteners extending from a bottom surface of said base plate.

* * * * *